United States Patent
Hoffmann

[19]

[11] Patent Number: 6,094,963
[45] Date of Patent: Aug. 1, 2000

[54] AUGER TUBE REPAIR TOOL

[76] Inventor: John S. Hoffmann, 623 Robert St., Fort Atkinson, Wis. 53538

[21] Appl. No.: 09/232,364

[22] Filed: Jan. 15, 1999

Related U.S. Application Data

[60] Provisional application No. 60/071,957, Jan. 20, 1998.
[51] Int. Cl.[7] .................................................. B21D 3/14
[52] U.S. Cl. ................................................ 72/454; 72/304
[58] Field of Search ........................... 72/304, 308, 454, 72/705

[56] References Cited

U.S. PATENT DOCUMENTS

| | | | |
|---|---|---|---|
| 4,445,264 | 5/1984 | Banerian | 72/454 |
| 4,495,687 | 1/1985 | Sieveking | 72/454 |
| 4,519,235 | 5/1985 | Gauck | 72/454 |
| 4,761,987 | 8/1988 | Gamauf | 72/705 |
| 5,205,150 | 4/1993 | Nyffeler | 72/454 |

*Primary Examiner*—David Jones

[57] ABSTRACT

The present invention is a simple way to repair tubes, especially metal tubes such as are used in agricultural implements including combines. The present invention comprises plates and a means of bringing said plates together, compressing the tube between the plates until a deformation is sufficiently removed so bearings mounted on the auger tube can be properly oriented for support of fingers contained within the auger tube.

2 Claims, 3 Drawing Sheets

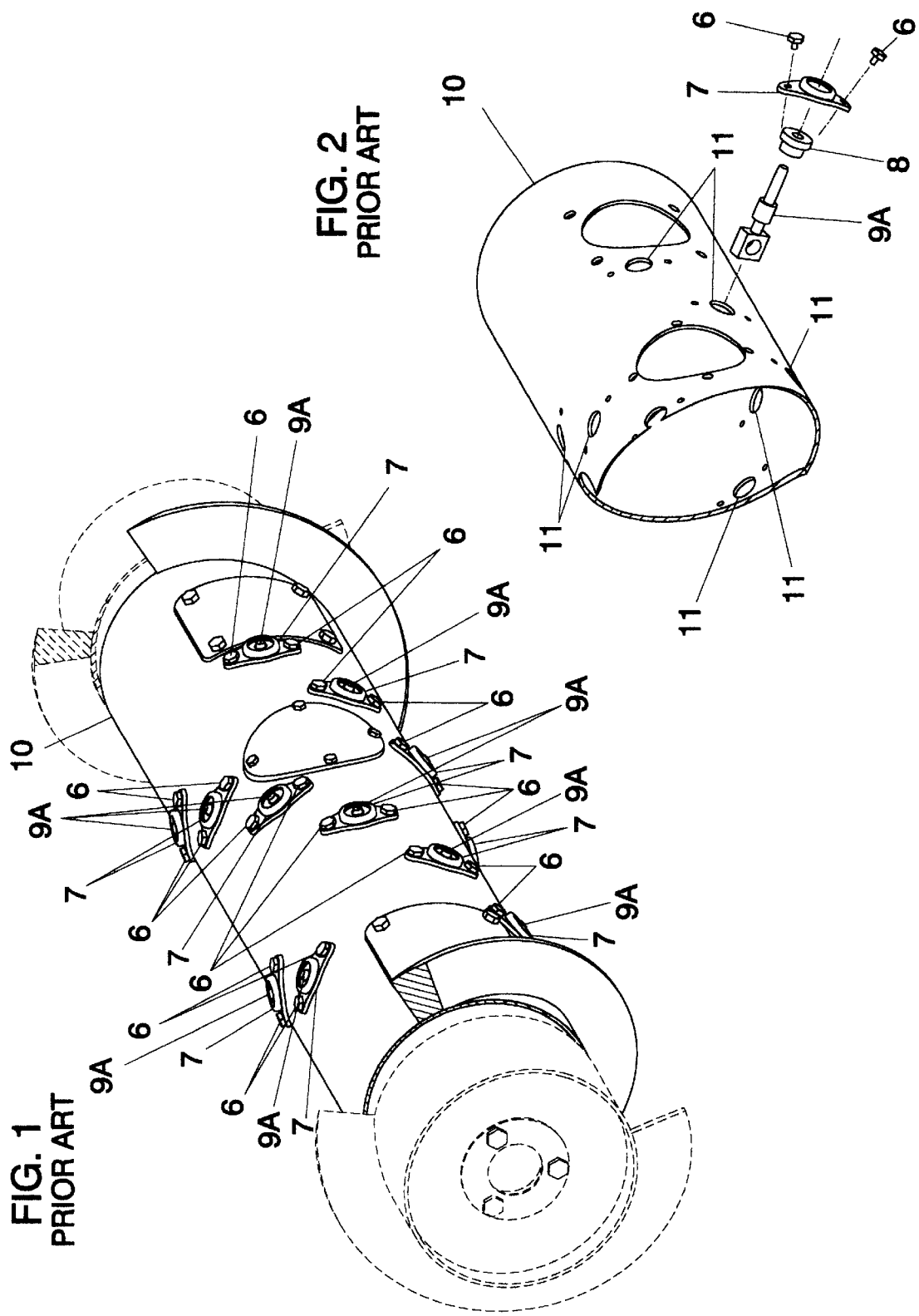

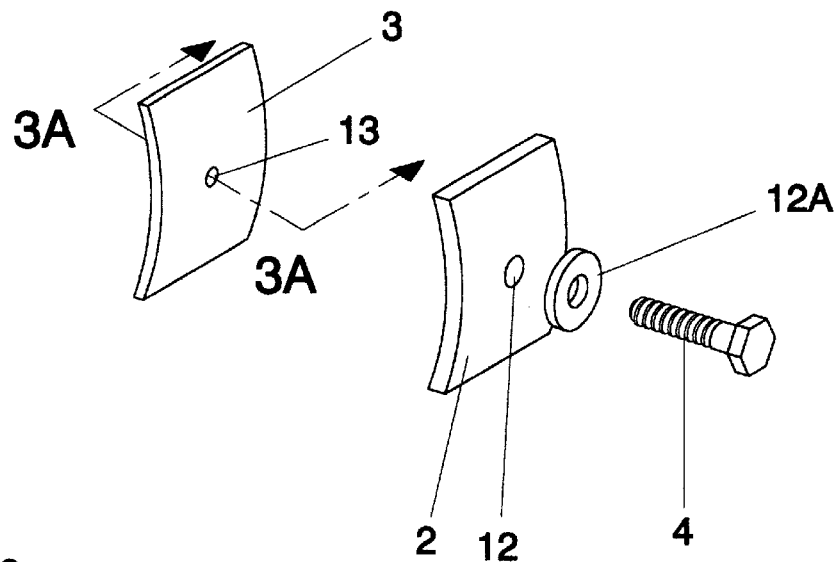
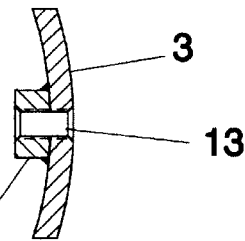
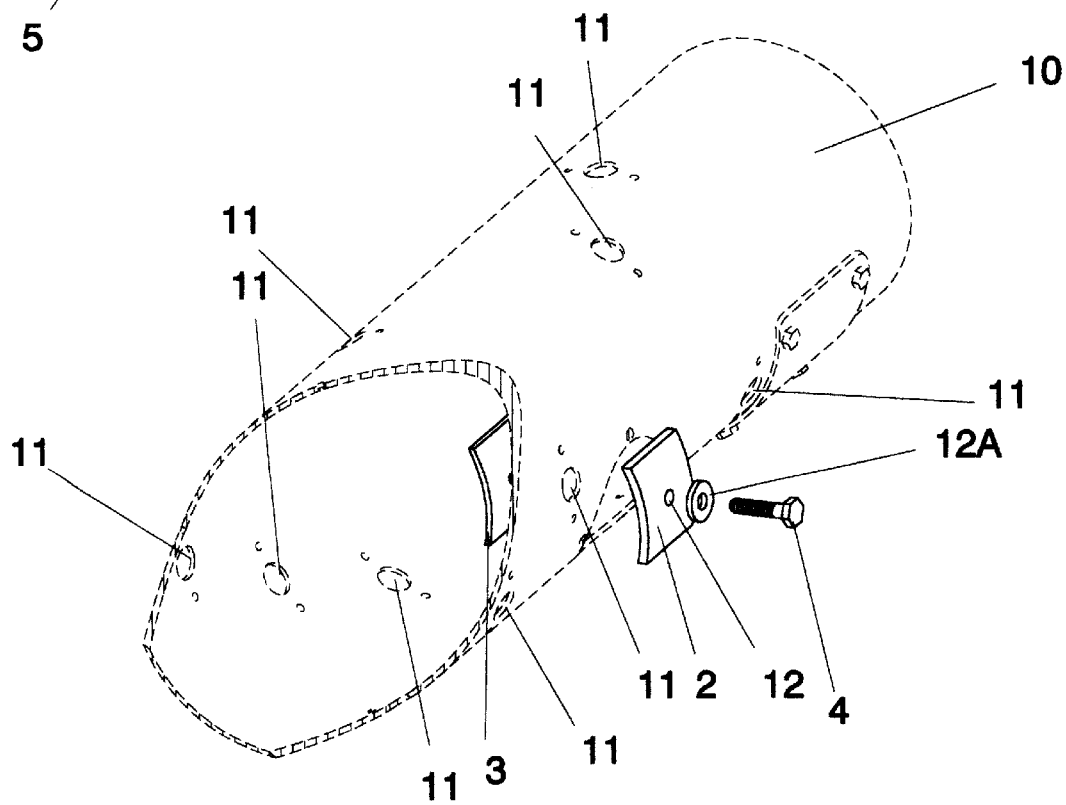

AUGER TUBE REPAIR TOOL

CROSS REFERENCES TO RELATED APPLICATION

Provisional Application for Pat. Ser. No. 60/071,957 filed Jan. 20, 1998, Auger Tube Repair Tool. Pursuant to 35 U.S.C. Par. 119(e) (i) applicant claims priority of said Provisional Application for Patent.

Statement as to Rights to inventions made under Federally sponsored research and development: Not applicable

BACKGROUND OF THE INVENTION

1. Field of the Invention

This invention relates to a method of and a tool for repairing deformations in tubes, especially metal tubes used as feed grain auger tubes in agricultural implements including grain combines.

2. Background Information

Many agricultural combines with grain platforms have an auger tube which include fingers which are supported on at least one end by hanger bearings mounted on the sides of the auger tube. Occasionally the grain platform will pick up a rock. when this happens, the rock is fed to the center of the platform by the auger and then it comes in contact with the retractable gathering fingers that feed material to a feeder house. The retractable fingers have a machined groove so the fingers break when a rock is picked up. Typically the force that breaks the finger will also bend the auger tube, a guide bearing, and a bearing retainer. To repair the damage the radius of the auger tube needs to be restored so the bearing will be properly orientated to the finger. If the tube is not corrrected, the bearing will bind on the finger and prevent the auger from rotating freely and can cause the finger to force the bearing out of the tube and leave the finger running in a metal to metal state with high wear as a result. Currently there is no good way to correct the tube. People attempt to repair the damage to the radius of the auger tube where a bearing that supports a finger will be mounted by using hammers and pry bars. Often heating of the auger tube is required. Often removal of the auger tube from the implement is required. As will be seen from the subsequent description of the preferred embodiments of the present invention that the present invention overcomes this problem.

SUMMARY

The present invention is a simple way to repair a tube such as, but not restricted to, feed grain auger tubes used in agricultural implements including feed grain combines. The present invention includes plates with curvatures matching the tube to be repaired and the means of bringing the plates together so as to remove deformations. This restores the auger tube to its original curvature so bearings mounted on the rim of the auger tube can be properly oriented for the support of fingers contained within the auger tube.

BRIEF DESCRIPTION OF THE DRAWINGS

FIG. 1 shows a typical prior art auger tube

FIG. 2 shows a portion of a typical prior art auger tube and related hardware.

FIGS. 3 and 3A shows views of the present invention, an auger tube repair tool.

FIG. 4 shows a view of a typical application of the auger tube repair tool.

DESCRIPTION OF THE PREFERRED EMBODIMENTS

Figure 5:
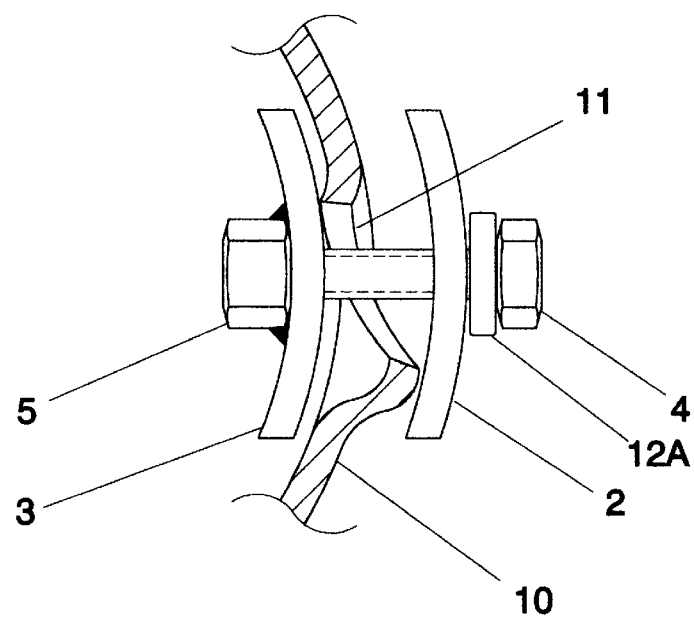
FIG. 5 shows the auger tube repair tool mounted on a damaged auger tube.

Referring to FIGS. 1 and 2, a typical prior art auger tube 10, which in this case is a John Deere 200 series combine auger tube, includes tube clearances 11 into each of which a bearing 8 will be inserted then retained by a bearing retainer 7 and cap screws 6. The bearing 8 typically is a molded plastic sleeve with a flange. Typical fingers, 9A are contained within the auger tube 10, the ends of which are supported by bearings 8. When a rock displaces an end of a finger 9A, the bearing 8 is usually damaged and the auger tube 10 is usually deformed in the immediate area of the tube clearances 11 (Ref. FIG. 5). FIG. 2 shows only one finger 9A as a drawing convenience. There is a corresponding finger 9A for every bearing 8 in the auger tube 10, although only one is shown in the FIG. 2 as a drawing convenience.

Referring to FIGS. 3 and 4, the preferred embodiment of the present invention, an auger tube repair tool comprises an outer plate 2, an inner plate 3 with a clearance 13 and an engagement thread 5, a washer 12A, and a means of bringing the outer plate 2 and the inner plate 3 together in a pressing action against the auger tube 10 which is contained between the plates 2 and 3 while being repaired.

In the preferred embodiment of the present invention, said means of bringing the outer plate 2 and the inner plate 3 together is a bolt 4.

In the preferred embodiment of the present invention, the engagement thread 5 is obtained by welding a nut to the inside plate 3 so the nut is in line with the clearance 13. As obvious to anyone skilled in the art, this could be achieved with an integral threaded boss on the inner plate 3 or by threading a sufficiently thick plate. For best results, the engagement thread 5 is kept lubricated.

The outer plate 2 includes a bolt clearance 12 sufficiently large to permit passage of the bolt 4.

The clearance 13 of the inner plate 3 is in line with the engagement thread 5 and is sufficiently large to permit insertion of the bolt 4 through the clearance 13 and threaded into the engagement thread 5.

Figure 6:
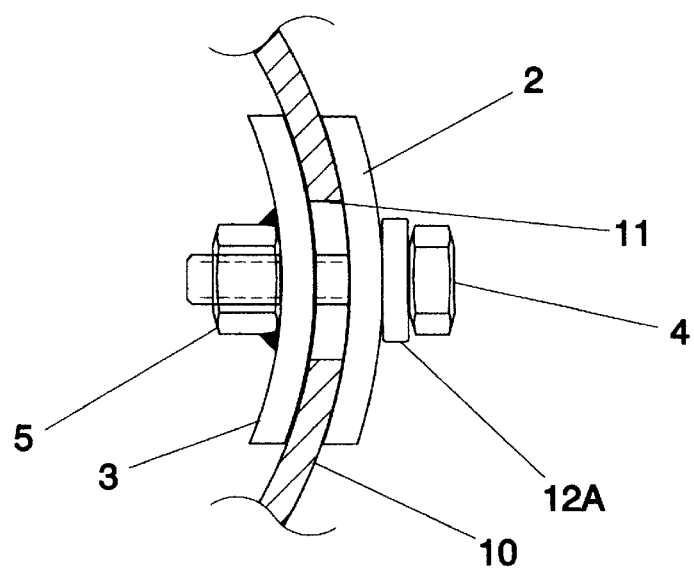
FIG. 6 shows the damaged auger tube as repaired by the auger tube repair tool prior to removal of the auger tube repair tool.

To repair a deformation in material surrounding a tube clearance 11 in an auger tube 10, (Ref. FIGS. 4, 5, and 6) the inner plate 3 is placed inside the auger tube 10, with the engagement thread 5 and the clearance 13 (Ref. FIG. 3A) aligned with the clearance 11. The outer plate 2 is placed outside the tube clearance 11, with the bolt clearance 12 of the plate 2 in line with the tube clearance 11. The bolt 4 is inserted through the washer 12A and the clearances 12, 11, and 13 and threaded into the nut 5. As obvious to any mechanic, the parts are sufficiently aligned so the bolt 4 can be inserted as described. The bolt 4 is tightened until the auger tube 10 is compressed within the inner plate 3 and the outer plate 2 until said deformation in material surrounding the tube clearance 11 in the auger tube 10 is removed sufficiently to permit installation of an undamaged bearing 8 which can then support an end of a finger 9A more accurately than would have been the case of trying to repair by heating deformed auger tube 10 and then working on it with hammers and pry bars. Also, the auger tube 10 usually can be repaired without removal from its installation on an implement using the present invention.

FIG. 5 shows the auger tube repair tool 1 in place on an auger tube 10 requiring repair just prior to a repair person tightening the bolt 4 of the auger tube repair tool 1. A ratchet wrench works well for tightening the bolt 4.

FIG. 6 illustrates the auger tube 10 after repair, with the bolt 4 of the auger tube repair tool fully tightened. The auger tube repair tool can now be removed from the auger tube 10 by untightening and removing the bolt 4 and then removing the inner plate 3, the outer plate 2, and the washer 12A.

Both the inner plate 3 and the outer plate 2 have curvatures matching the auger tube 10.

In the preferred embodiment of the present invention, the parts are of steel.

Although the description above contains many specificities, these should not be construed as limiting the scope of the invention but as merely providing illustrations of some of the presently preferred embodiments of this invention. For example, various manufacturers uses auger tubes with different diameters, so the diameters shown in the drawings will vary with the brand of tube. The plates are shown as square, however, as obvious to anyone skilled in the art, other shapes, such as round or oval would also work. The square shapes are a production efficiency to minimize production tooling costs. In the present invention, a simple way to achieve an engagement thread 5 is to weld a nut to the inner plate 3 to receive the bolt 4. As obvious to anyone skilled in the art, a one piece threaded casting would serve the same purpose, as would a threaded boss on the inner plate 3. Also, if the inner plate 3 was thick enough, a threaded aperature could suffice. By bolt is meant a threaded rod with a head which can be driven by a common wrench or a socket head drive. A ¾-10×2.0 UNC bolt serves the purpose well, but as obvious to anyone skilled in the state of the art, other variations would accomplish the same purpose. The invention is intended to be used with a common wrench or socket head drive, which are common tools around a typical farm maintenance shop. The use of the washer 12A through which the bolt 4 is inserted so the washer 12A surrounds the threaded rod of the bolt 4 and is contained between the head of the bolt 4 and the outher plate 2 is a preferred embodiment of the present invention. As obvious to anyone skilled in the art, a bolt which had a head with a flange instead of the washer might suffice, but the washer 4 serves well and is easily replaced if worn, corroded, or lost. Also, the invention will work without the washer, albeit not as well.

Thus the scope of the invention should be determined by the appended claims in the formal application and their legal equivalents, rather than by the examples given.

I claim:

1. A method of repairing a deformation in material around a finger-receiving hole in an auger tube, comprising the steps of:

removing a finger and its associated bearing from the auger tube to reveal the finger receiving hole;

inserting an inner plate having a radius of curvature conforming to the radius of curvature of the auger tube inside the auger tube, said inner plate having a first opening that is aligned with said finger-receiving hole, wherein of central opening of said inner plate comprises female threads therein;

placing an outer plate having a radius of curvature conforming to the radius of curvature of the auger tube on the outer face of the auger tube, said outer plate having a second opening that is aligned with said finger-receiving hole and with said first opening of said inner plate; and inserting a threaded bolt through said second opening of said outer plate, said finger receiving hole, said first opening of said inner plate, and into said female threads to clamp said inner and outer plates together, thereby pressing the deformation out of the auger tube.

2. A method of repairing a deformation in material around a finger-receiving hole as recited in claim 1, and further comprising the steps of:

removing said bolt, said inner plate, and said outer plate; and installing an undamaged finger into said finger-receiving hole.

\* \* \* \* \*